June 23, 1925.

R. S. LEWIS 1,543,581

SNUBBING DEVICE

Filed April 1, 1924

2 Sheets-Sheet 1

Inventor:
Royal S. Lewis,
by Babcock & Son
Att'ys.

June 23, 1925.  R. S. LEWIS  1,543,581
SNUBBING DEVICE
Filed April 1, 1924   2 Sheets-Sheet 2
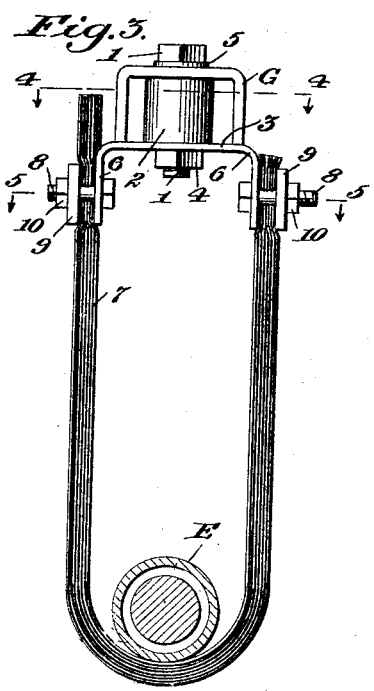
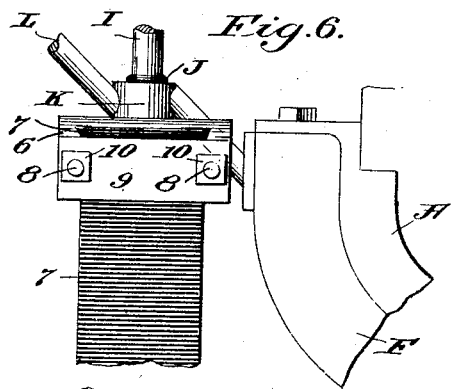
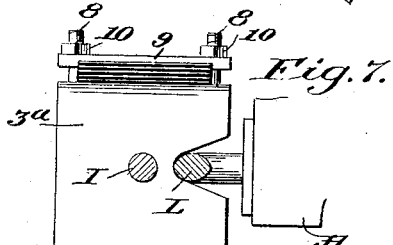
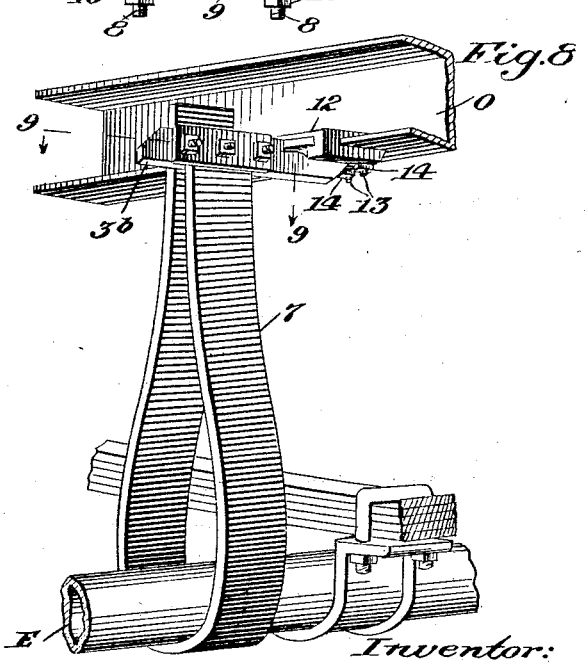
Inventor:
Royal S. Lewis,
by W. H. Babcock & Son
Att'ys Patented June 23, 1925.

1,543,581

UNITED STATES PATENT OFFICE.

ROYAL S. LEWIS, OF YAKIMA, WASHINGTON.

SNUBBING DEVICE.

Application filed April 1, 1924. Serial No. 703,498.

*To all whom it may concern:*

Be it known that I, ROYAL S. LEWIS, a citizen of the United States, residing at Yakima, in the county of Yakima and State of Washington, have invented certain new and useful Improvements in Snubbing Devices, of which the following is a specification.

This invention relates to rebound checking or snubbing units and elements thereof and their combination and association with automobile frames and their axles to effectually prevent the abrupt rebounding of the springs and the jar heretofore imparted to the body when traveling over a rough surface.

The invention has for its primary objects to provide an elastic or resilient snubbing element uniform and gradual in snubbing action; to provide a long length of active resilient snubbing material between the points of engagement or attachment with or to the two relatively movable parts of the automobile to which they are applied; to provide an open loop snubbing element to facilitate its application to the parts of the automobile; to provide means for adjusting one end of the snubbing element to take up slack in said element or to reduce or increase the tension thereon without disturbing the fastening means of the other end of the loop or rubber strap; to provide a single bracket adapted to be mounted directly over the axle or other part embraced by the snubbing loop, to which bracket both ends of the snubbing loop are connected; to provide a simple inexpensive bracket construction which may be stamped from heavy sheet metal in one integral piece; and to provide independent means for clamping each end of the loop separately to said bracket to anchor said ends without cutting or penetrating the material thereof, all of which objects, among others, are accomplished by the construction, combination and arrangement of parts, all as hereinafter more particularly described, set forth and claimed.

Figure 1:
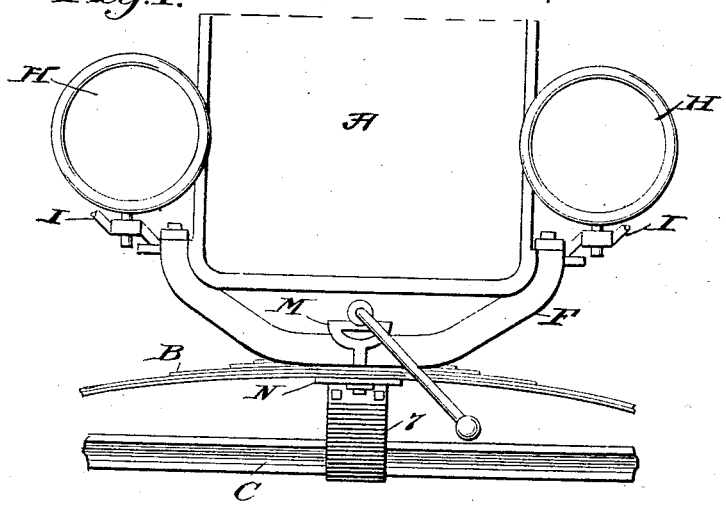
Figure 2:
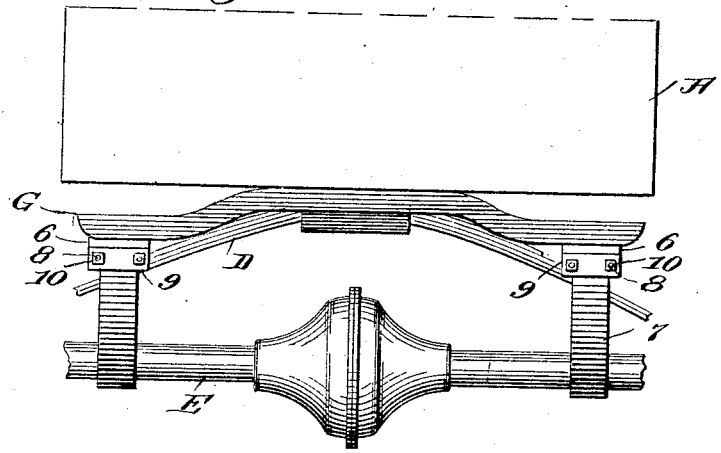

In the accompanying drawings illustrative of several forms or embodiments of my invention simply as instances of the practice of my invention:

Figure 1 represents a fragmentary view in front elevation of a Ford automobile with a snubbing unit embodying my invention applied thereto;

Figure 2, a similar view of the rear of a Ford automobile with two units embodying my invention applied thereto;

Figure 3, a detail side elevation of one of the units shown in Fig. 2 as applied, the rear axle being shown in section;

Figure 4, a sectional view on the line 4—4 of Fig. 3, looking in the direction of the arrows;

Figure 5, a sectional view on the line 5—5 of Fig. 3, looking in the direction of the arrows;

Figure 6, a fragmentary front elevation of a modified form of unit intended for attachment to the front fender and lamp bracket, illustrated in fragmentary view, of a Ford automobile when two snubbing units are to be used on the front of a Ford automobile;

Figure 7, a sectional view on the line 7—7 of Fig. 6, looking in the direction of the arrow and showing the modified form of bracket of Fig. 6 in top plan view;

Figure 8, a perspective view of a modified universal form of unit as applied to the channel side frame member of an automobile, said channel frame member, and the axle and spring, being broken away; and Figure 9, a sectional view on the line 9—9 of Fig. 8.

Referring now in detail to the drawings, A designates an automobile, a Ford automobile being illustrated, having a front transverse spring B and axle C and rear transverse spring D and axle E, a front frame channel member F, a rear frame channel member G, lamps H and lamp brackets I secured by shoulder J and a nut, not shown, respectively, in the vertical bores of enlargements or hubs K formed in the respective front fender brackets L. M designates the U-shape clamp bolt receiving a bottom plate N and nuts on its screw-threaded ends to hold the front spring B secured to the front channel frame member F, all as has long been embodied in the well known Ford automobile.

In use the snubbing units will be applied in most instances in sets of four, one unit at each side of the front and rear, though, if desired, on light automobiles, especially Ford automobiles, three only may be used, one at each side of the rear and one in the middle of the front.

To apply to a Ford automobile as illustrated in Figures 1 to 5 inclusive, a bolt 1 is inserted downwardly through a perforation in one end portion of the rear channel frame member G, a spacing sleeve 2 is then slipped on the bolt 1 and thereafter the bracket 3 having a central perforation is slipped over the end of said bolt 1 and a nut 4 applied thereto and turned up tight to draw the bracket 3 firmly into engagement with the lower edges of the sides of the channel frame member G and of the spacing sleeve 2, the upper end of which is in firm engagement with the opposed lower face of the said channel frame member G.

Preferably lock washers 5 will be applied to the bolt 1 to be located between the head of the bolt 1 and the adjacent portion of the frame member G and between the nut 4 and the lower face of the bracket 3.

The bracket 3 has two preferably integral vertically depending flanges 6 lying parallel to each other and to the axis of the rear axle and equidistant from a vertical plane intersecting said axis, the said flanges 6 being each provided with a perforation near each end, the perforations in the one flange registering with the corresponding perforations in the other flange, and being spaced apart in each flange a distance corresponding to the width of the snubbing elastic strap 7, and receiving respectively the bolts 8 which pass through corresponding perforations in clamping plates 9 which respectively cooperate with said flanges 6 to hold firmly frictionally against slipping the intervening portions of the respective end portions of the snubbing loop or strap 7, nuts 10 being applied respectively to the ends of the bolts 8 to engage the respective clamp plates 9 and move them toward the respective flanges 6 for such clamping action.

The elastic or rubber strap 7 having its end portions held as above described, extends around beneath the rear axle E and should preferably be adjusted as illustrated in Fig. 3 to be free of slack, but in case it becomes slack in use or it be desired to put it under tension in normal inactive condition this may be done to suit individual preference by loosening one end of the strap 7 without disturbing the other end of the strap 7 merely by loosening up one clamping plate 9 and drawing the corresponding end portion of the strap 7 through between said plate 9 and the opposed face of the cooperating flange 6.

Thus the fastening and means of adjustment of each end of each snubbing strap or loop 7 is independent of that of the other, so that either may be adjusted as most convenient without disturbing the other.

Another unit such as above described will be applied, as above described, to the other end portion of said channel frame member G and the rear axle E, it being desirable, however, to see that the two straps 7 of the units applied to the frame member G and the rear axle E are adjusted to approximately the same degree of tension or slackness.

Where but three are applied, two in the rear and one in the front in the middle, the front unit will be mounted on the rear leg, as illustrated, or forward leg, of the U-shape bolt M, the nut of which will be first removed and the bracket 3 will receive the end of said leg through its central perforation. As to this bracket 3 the spacing sleeve 2 will be omitted as the upper face of said bracket 3 will lie flat up against the opposed face of the clamp plate N passing under the central portion of the front spring B. After said bracket 3 is applied to the end of said rear leg of the U-shape bolt M the nut normally turned on said leg will be applied thereto and turned up tight to hold the said bracket 3 firmly in position and the assemblage, as to this front unit, will in all other respects be the same in construction, combination and operation as above described.

Where a set of four units is used two units will be applied at the front and in Figures 6 and 7 I have illustrated a modified form of bracket 3ª for association with the front fender and lamp brackets of a Ford automobile, said bracket 3ª in addition to the central bore or perforation being formed with a notch or recess 11 in one side to accommodate the leg of the fender bracket L, the central perforation receiving the lower end of the lamp bracket I protruding below the hub K, and the usual nut, not shown, being turned up on said protruding screw threaded end of the lamp bracket I below the lower face of said bracket 3ª, the usual annular stop collar J serving to hold said bracket I against being drawn through said hub K by the nut beyond a predetermined point.

In Figures 8 and 9 I have illustrated a modified form of snubbing unit adapted for universal application to all automobiles and to this end have provided a bracket having a mouth or slotted portion 12 to receive the lower horizontal portion of an U-shape side channel frame member O and to be clamped thereto by binding screws 13 having usual lock nuts 14. From this slotted portion 12 extends the bracket arm 3ᵇ provided with three perforations having their axes parallel and in the same horizontal plane, the central perforation being midway between the two end perforations and having one side of the adjacent portion of the bracket arm 3ᵇ countersunk, as illustrated in Fig. 9. Two clamping plates 9 and 9ª are associated with said bracket arm 3ᵇ, the plate 9ª being provided with three perforations registering with the perforations in said arm 3ᵇ, and the plate 9 being provided with two perforations respectively registering with the end perforations in bracket arm 3ᵇ.

In assembling, a short bolt 8ᵇ is inserted through the central perforation in said arm 3ᵇ and plate 9ᵃ and the intervening material of one end portion of the snubbing strap 7 and a nut 10 applied to said bolt 8ᵇ and turned up tight thereon to clamp said end portion of the strap 7 between the bracket arm 3ᵇ and the plate 9ᵃ, and then bolts 8ᵃ are inserted on either side of the strap 7 through the end perforations in said plate 9ᵃ and plate 9 and the intervening bracket arm 3ᵇ and nuts 10 respectively turned on the ends of said bolts 8ᵃ. The other end portion of the strap 7, after being passed beneath the axle E so as to embrace the same, will then be threaded through between the adjacent faces of the plate 9 and the bracket arm 3ᵇ between the bolts 8ᵃ, and will be drawn up to the desired adjustment to take up slack or to put the strap 7 under a tension, as desired, when the nuts 10 will be turned up tight on the bolts 8ᵃ to draw the plate 9 toward arm 3ᵇ and so clamp tightly between them the intervening material of the adjustable end portion of the strap 7. In this modified form it will be noted that the construction involves the piercing of one end portion of the band 7 in anchoring such end portion, but that the other and adjustable end portion is held by binding or frictional engagement only without any cutting or piercing and that the latter end portion is adjustable entirely independently of, and without in any manner disturbing, the other end portion of said strap 7. The head of bolt 8ᵇ will preferably be beveled, as illustrated, in order that its end may lie flush with the face of the bracket arm 3ᵇ. Otherwise the construction, application and operation of this modified form is in all respects the same as in the forms previously described.

Having thus described my invention, what I claim as new and desire to secure by Letters Patent is:

1. A snubbing unit comprising a bracket, means for securing said bracket rigidly to an automobile body over an axle of the automobile chassis, in combination with an open rubber snubbing loop extending under the axle, clamping means for anchoring one end of said loop to said bracket, an independent non-piercing clamping means for anchoring the other end of said loop to said bracket and for permitting the independent freeing and adjustment of said latter end portion through the clamping means to take up slack and adjust the tension of the loop without disturbing the clamping means for the former end portion of said loop.

2. In a snubbing unit, an open snubbing loop adapted to extend under the axle of an automobile and an anchoring means for association with a channeled frame member of an automobile body, said anchoring means comprising a perforated plate, a bolt adapted to extend through a perforation in said frame member and the perforation in said plate, means associated with said bolt for forcing and holding said plate against the side edges of said channeled frame member, a spacing sleeve surrounding said bolt between the opposed faces of said frame member and said plate and corresponding in length to the depth of said frame member to prevent buckling of said plate, and independent clamping means for each end portion of said snubbing loop, said clamping means being carried by and cooperating with said bracket.

3. A snubbing unit comprising an integral bracket adapted to be held to an automobile frame element and having two depending substantially parallel flanges, in combination with an open rubber snubbing loop, and clamping means respectively cooperating with said flanges to frictionally hold the respective end portions of said snubbing loop between the respective flanges and their cooperating clamping means, said clamping means being independently adjustable in order that one end portion of said loop may be moved endwise in either direction between its respective flange and cooperating clamping means to secure the desired tension on said loop without disturbing the other end portion thereof.

In testimony whereof, I have signed my name to this specification at Yakima, Washington, this 26 day of March, 1924.

ROYAL S. LEWIS.